US012323438B2

(12) United States Patent
Brown et al.

(10) Patent No.: US 12,323,438 B2
(45) Date of Patent: *Jun. 3, 2025

(54) MALICIOUS INCIDENT VISUALIZATION

(71) Applicant: CrowdStrike, Inc., Sunnyvale, CA (US)

(72) Inventors: Daniel W. Brown, Ipswich, MA (US); Thomas R. Hobson, Brookline, MA (US); Hyacinth D. Diehl, Minneapolis, MN (US); Alexander J. Graul, London (GB)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/094,580

(22) Filed: Jan. 9, 2023

(65) Prior Publication Data

US 2023/0164152 A1    May 25, 2023

Related U.S. Application Data

(63) Continuation of application No. 16/943,949, filed on Jul. 30, 2020, now Pat. No. 11,588,832.

(Continued)

(51) Int. Cl.
*H04L 9/40* (2022.01)

(52) U.S. Cl.
CPC ...... *H04L 63/1416* (2013.01); *H04L 63/1425* (2013.01); *H04L 63/1441* (2013.01)

(58) Field of Classification Search
CPC ............. H04L 63/1416; H04L 63/1425; H04L 63/1441
See application file for complete search history.

(56) References Cited

U.S. PATENT DOCUMENTS 9,148,441 B1 *   9/2015   Tamersoy ............. G06F 21/566
9,158,811 B1    10/2015   Choudhary et al.
(Continued)

FOREIGN PATENT DOCUMENTS

EP    3206366         8/2017
EP    3528459 B1 *   2/2019   ......... G06F 16/2455
(Continued)

OTHER PUBLICATIONS

Office Action for U.S. Appl. No. 16/943,755, mailed on Sep. 7, 2021, Graul, "Visualization and Control of Remotely Monitored Hosts", 13 Pages.

(Continued)

*Primary Examiner* — Noura Zoubair
*Assistant Examiner* — Afaq Ali
(74) *Attorney, Agent, or Firm* — Lee & Hayes, P.C.

(57) ABSTRACT

Techniques to provide visualizations of possible malicious incidents associated with an event on a host device may include causing presentation of graphics of a process or thread in a user interface. Information about detected events may be transmitted to a computing device that generates the visualizations for presentation to an analyst to verify the malicious incidents. Based on patterns and information conveyed in the visualizations, the computer device or host device may take action to protect operation of the host device caused by the event.

20 Claims, 7 Drawing Sheets

Related U.S. Application Data

(60) Provisional application No. 62/882,339, filed on Aug. 2, 2019.

(56) References Cited

U.S. PATENT DOCUMENTS

| | | | |
|---|---|---|---|
| 9,350,749 B2* | 5/2016 | Hebert | H04L 63/1416 |
| 9,407,652 B1 | 8/2016 | Kesin et al. | |
| 9,516,053 B1 | 12/2016 | Muddu et al. | |
| 9,594,904 B1 | 3/2017 | Jain et al. | |
| 10,009,358 B1* | 6/2018 | Xie | G06F 21/552 |
| 10,320,813 B1 | 6/2019 | Ahmed et al. | |
| 10,681,060 B2* | 6/2020 | Scheidler | G06N 20/00 |
| 10,735,272 B1 | 8/2020 | Saurabh | |
| 10,778,699 B1 | 9/2020 | Bradley et al. | |
| 10,958,667 B1* | 3/2021 | Maida | H04L 63/1425 |
| 10,992,693 B2 | 4/2021 | Luo et al. | |
| 11,102,244 B1 | 8/2021 | Jakobsson et al. | |
| 11,140,179 B1* | 10/2021 | Infante-Lopez | H04L 63/1416 |
| 11,336,670 B2* | 5/2022 | Beck | G06F 16/2455 |
| 2002/0083343 A1 | 6/2002 | Crosbie et al. | |
| 2007/0209074 A1 | 9/2007 | Coffman | |
| 2012/0137367 A1 | 5/2012 | Dupont et al. | |
| 2013/0021382 A1 | 1/2013 | Morlock et al. | |
| 2015/0242637 A1 | 8/2015 | Tonn et al. | |
| 2015/0334132 A1 | 11/2015 | Zombik et al. | |
| 2016/0226904 A1 | 8/2016 | Bartos et al. | |
| 2016/0344762 A1 | 11/2016 | Jou et al. | |
| 2017/0093900 A1 | 3/2017 | Nomura et al. | |
| 2017/0171389 A1 | 6/2017 | Lopez et al. | |
| 2017/0230392 A1 | 8/2017 | Dean et al. | |
| 2017/0288979 A1 | 10/2017 | Yoshihira et al. | |
| 2018/0159876 A1* | 6/2018 | Park | H04L 63/1425 |
| 2018/0167402 A1 | 6/2018 | Scheidler et al. | |
| 2018/0227322 A1 | 8/2018 | Luo et al. | |
| 2018/0288060 A1 | 10/2018 | Jackson et al. | |
| 2018/0316704 A1* | 11/2018 | Joseph Durairaj | H04L 41/145 |
| 2018/0367548 A1 | 12/2018 | Stokes, III et al. | |
| 2019/0068627 A1 | 2/2019 | Thampy | |
| 2019/0207969 A1* | 7/2019 | Brown | G06F 21/552 |
| 2019/0266325 A1* | 8/2019 | Scherman | G06F 16/3347 |
| 2019/0362074 A1 | 11/2019 | Wang et al. | |
| 2020/0004964 A1* | 1/2020 | Soumenkov | G06F 16/289 |
| 2020/0076853 A1 | 3/2020 | Pandian et al. | |
| 2020/0128047 A1* | 4/2020 | Biswas | H04L 67/10 |
| 2020/0159380 A1 | 5/2020 | Wadikar et al. | |
| 2020/0304462 A1* | 9/2020 | Kopp | H04L 63/02 |
| 2020/0366699 A1 | 11/2020 | Sampaio et al. | |
| 2020/0410403 A1 | 12/2020 | Kamulete | |
| 2021/0037024 A1 | 2/2021 | Brown | |
| 2021/0037027 A1 | 2/2021 | Brown et al. | |
| 2021/0037028 A1 | 2/2021 | Brown et al. | |
| 2021/0037035 A1 | 2/2021 | Graul | |

FOREIGN PATENT DOCUMENTS

| | | |
|---|---|---|
| EP | 3528459 | 8/2019 |
| EP | 3528459 A1 | 8/2019 |

OTHER PUBLICATIONS

Extended European Search Report from the European Patent Office for Application No. 20189038.1, mailed on Dec. 10, 2020, a counterpart foreign application of U.S. Appl. No. 16/943,949, 10 pages.

Extended European Search Report from the European Patent Office for Application No. 20189044.9, mailed on Dec. 14, 2020, a counterpart foreign application of U.S. Appl. No. 16/943,755, 8 pages.

Extended European Search Report from the European Patent Office for Application No. 20189051.4, mailed on Dec. 18, 2020, a counterpart foreign application of U.S. Appl. No. 16/944,052, 9 pages.

Extended European Search Report mailed on Dec. 8, 2020 for European Patent Application No. 20189028.2, 11 pages.

Kang et al, "Parameter and quantile estimation for the generalized Pareto distribution in peaks over threshold framework", Journal of Korean Statistical Society, vol. 46, No. 4, Mar. 18, 2017, pp. 487-501.

Office Action for U.S. Appl. No. 16/943,755, mailed on May 5, 2021, Graul, "Visualization and Control of Remotely Monitored Hosts", 17 Pages.

Office Action for U.S. Appl. No. 16/943,949, mailed on Jun. 22, 2022, Brown, Malicious Incident Visualization, 23 pages.

Office Action for U.S. Appl. No. 16/944,052, mailed on Mar. 30, 2022, Brown, "Advanced Incident Scoring", 16 pages.

Office Action for U.S. Appl. No. 16/943,755, mailed Apr. 4, 2022, Graul, "Visualization and Control of Remotely Monitored Hosts", 13 pages.

Office Action for U.S. Appl. No. 16/944,033, mailed on Aug. 26, 2022, Brown, "Mapping Unbounded Incident Scores to a Fixed Range", 19 Pages.

* cited by examiner

MALICIOUS INCIDENT VISUALIZATION

This application claims priority to and is a continuation of U.S. patent application Ser. No. 16/943,949, filed Jul. 30, 2020, titled "MALICIOUS INCIDENT VISUALIZATION," which claims priority to U.S. Provisional Patent Application No. 62/882,339, filed on Aug. 2, 2019, the entirety of both are incorporated herein by reference.

BACKGROUND

With computer and Internet use forming an ever greater part of day to day life, security exploits and cyberattacks directed to stealing and destroying computer resources, data, and private information are becoming an increasing problem. Some attacks are carried out using "malware", or malicious software. "Malware" refers to a variety of forms of hostile or intrusive computer programs that, e.g., disrupt computer operations or access sensitive information stored on a computer (e.g., viruses, worms, Trojan horses, ransomware, rootkits, keyloggers, spyware, adware, or rogue security software). Malware is increasingly obfuscated or otherwise disguised in an effort to avoid detection by security software. Determining whether a program is malware or is exhibiting malicious behavior can thus be very time-consuming and resource-intensive.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
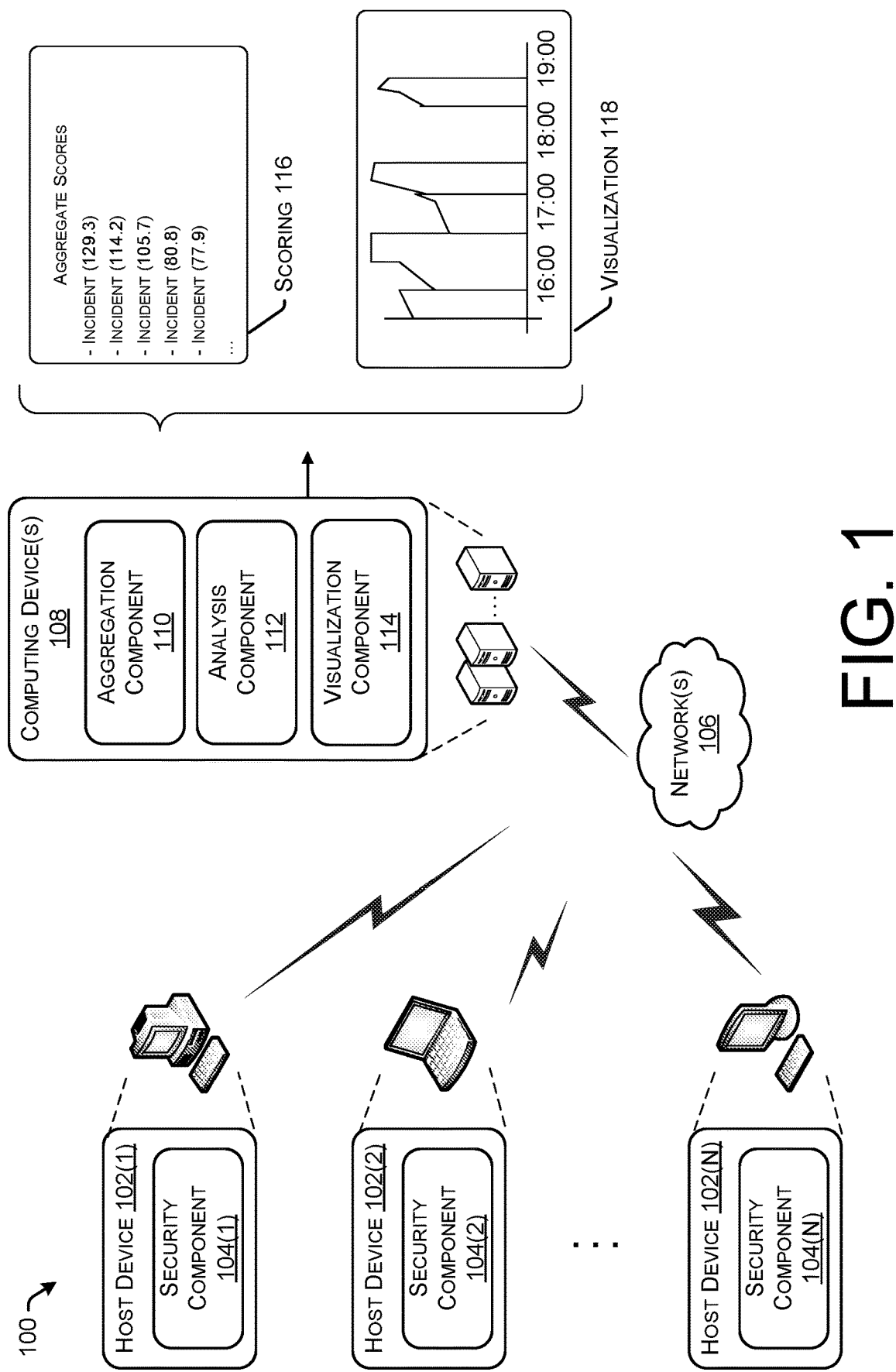
FIG. 1 illustrates an example system for a security service system that monitors a plurality of host devices and uses a security component to facilitate collection of data for malicious incident detection, as described herein.

This disclosure describes, in part, techniques and systems for detecting possible malicious incidents associated with events processing on a host device, and generating a visual representation of the possible malicious incidents. For example, a system can monitor the host device and detect an incident of potential malicious behavior associated with an event (e.g., a process, a thread, and the like). The system may generate visual imagery (e.g., a graph or a map just to name a few) associated with the incident and output the visual imagery on a display device to represent one or more events and associated incidents of potential malicious behavior at the host device. In some examples, the visualization of the malicious incident can be presented to an analyst trained to identify malicious behavior represented in the visualization. By implementing the malicious incident detection techniques described herein, events (and incidents associated therewith) most likely to cause malicious behavior can be detected, scored, and output as a visualization thereby providing the analyst with a subset of events for analysis most likely to result in malicious behavior on the monitored host device.

The system may employ a variety of detection and filtering techniques to determine an incident score that indicates a level of possible malicious behavior associated with one or more events. In some examples, the system determines whether to generate a visual image for presentation based at least in part on incident score (e.g., a higher incident score indicating a higher likelihood of malicious behavior may be selected for generating the visual image over a relatively lower incident score indicating a lower likelihood for malicious behavior).

In some examples, the system may generate a graph for each incident and/or each event on the host device over a time interval. In various examples, the system may combine one or more graphs associated with a respective incident and/or event and output the combined graphs to represent activity occurring before and after a point in the time interval (e.g., to represent activity before and after a re-boot). In some examples, the system may combine a graph for the incident with a graph associated with a related event and/or incident on another host device.

The malicious incident detection techniques described herein can improve functioning of a computing device in a variety of ways. For example, employing the malicious incident detection and visualization techniques described herein can enable a host device to detect and verify malicious incidents that otherwise would go undetected. Outputting visualizations of potential malicious incidents for display using the techniques described herein improves an ability for an analyst (a human or a machine learned model) to confirm an incident as malicious intent and to implement action to mitigate an attack, even in circumstances when an attacker structures the attack to take place over time in small steps to avoid detection. As described herein, the malicious incident detection and visualization techniques may be implemented by a system to identify and visually display events for further analysis by the analyst thereby enabling the analyst to verify the event is associated with malicious behavior (e.g., an action by a processor of the host device that is abnormal and/or causes an undesired operation on the host device).

As described above and below, the system may correlate event data from a host device with data received from one or more other host devices. For instance, the system may determine that a user authentication event on the first host device initiates an activity for execution on a second host device. The system may also or instead identify data associated with the activity, generate an image to represent the activity, and/or combine the generated image with an image representing the user authentication event thereby visually correlating the event data from the host device and the activity data on the second host device.

In some examples, an event may be monitored by a system (e.g., a host device, a computing device remote from the host device, a service agent, or a combination thereof) over a period of time to identify a pattern associated with the event. The system may also or instead generate one or more visualizations (e.g., a graph, a map, an image, a diagram, an animation, and so on) for output in a user interface that represent the pattern associated with the event. An analyst (e.g., a human) may analyze the one or more visualizations to determine an action (e.g., remove the host device from a network, modify a process, modify a thread, etc.) that improves security of the host device associated with the event (versus taking no action, for instance.) Using the techniques described herein, a computing device can take preemptive actions to secure a host device from malicious behavior based at least in part on visualizations that represent a subset of available events associated with the host device.

In some examples, a computing device may receive data representing an event(s) from a host device and determine that another host device includes an activity or action related to the event(s). The computing device may output a visualization of the event(s) for display to indicate activity shared between two or more host devices (e.g., lateral movement). In various instances, visualizations associated with different events and/or incidents on different host devices may be output for display separately (e.g., a first graph associated with the first host device may appear separate from a second graph associated with the second host device) or as a single visualization (e.g., a single graph or image is output to represent a pattern of the event shared between the host devices).

In some examples, an event (e.g., a thread) may originate at a first host device and include at least some steps that are to occur on a second host device. Event information associated with the first host device may be output for display as a first image and event information associated with the second host device may be output for display as a second image. The first image and the second image may comprise separate graphs or maps that use symbols or imagery to show changes in how the event executes over time. In various instances, the event shared between the first host device and the second host device is captured visually using the first image (e.g., a first graph showing a pattern of the most likely event(s) to impact operation of the first host device over a time period) and the second image (e.g., a second graph showing a pattern of the most likely event(s) to impact operation of the second host device over the time period). In a non-limiting example, the system may generate and optionally output visual imagery of the thread injected into the second host device from the first host device.

A computing device or machine learned model may process data received from a host device and identify the events most likely to impact operation of the host device (e.g., determine a likelihood that the event includes a malicious incident). Data associated with a detected event may be processed (e.g., scored, aggregated, filtered, and/or ranked) by the computing device or the machine learned model to determine which event(s) are to be presented as visualization(s) on a display device. In this way, visualization(s) presented on the display device represents a subset of possible events occurring on the host device.

A system may comprise a computing device monitoring a host device to detect an incident associated with one or more events that occurred, or are occurring, on the host device within a time interval. The incident may indicate that the monitored host device may or may not have been "compromised" by malicious behavior (e.g., adversarial activity, malware, etc.) based on the information gathered from the detected events. In some examples, the system may communicate data for events performed by one or more programs on a monitored host device. As described herein, the data may be analyzed by the system to detect patterns in the events.

In some examples, the system may determine a score for the one or more patterns based on the importance of information conveyed in the patterns and/or based on a frequency of appearance for the one or more patterns. In various examples, patterns that appear frequently may correlate with less useful information (e.g., information that is relatively less likely to permit detecting a malicious incident); conversely, patterns that appear infrequently may correlate with more useful information (e.g., information that is relatively more likely to permit detecting a malicious incident). For instance, a first pattern appearing with a relatively high frequency may receive a lower pattern score than a second pattern appearing infrequently. The pattern scores may be adjusted by weights based on additional information detected by the system. For instance, if the system detects a similar pattern on multiple host devices at a similar time frame, the weight of the pattern score for that pattern may increase.

The pattern scores may be aggregated by a predetermined time interval into an incident score. The incident score may be compared to a threshold score to determine if an incident indicating malicious behavior is occurring. An incident is started when the incident score first exceeds the threshold score and ends when the incident score falls below the threshold score. The incident may be classified (e.g., based on event types) and tagged with additional information found in the data from the detected events and patterns. The incidents may be ranked by their incident scores to surface incidents with higher incident scores, which may indicate more signs of the device being "compromised" by malicious-behavior.

In various examples, once the system has determined that a particular host device comprises an incident score within a confidence threshold, the system may generate visualizations of the event associated with the host device. For instance, the system may generate a graph that maps unbounded incident scores and/or pattern scores to a fixed range for an analyst to review.

In some examples, the system may remotely store visualizations associated with different host devices and may combine, compare, correlate, and/or connect any number of stored visualizations to a pattern of activity on a different host device. By connecting the visualizations as described herein, the system may detect an incident related to a malicious incident (e.g., movement of attacker activity) occurring on the different host device prior to the different host device detecting the incident.

In additional examples, the system may present scores and visualizations (e.g., an image, activity graphs, and the like) on a user interface that enable an analyst to review the visualizations for possible malicious intent. By way of example and not limitation, the user interface may include one or more animated activity graphs to show the progress of a past malicious event from a start time to an end time.

Although in some examples the system comprises a computing device monitoring a host device, in other examples, the system may enable the detection and visualization techniques described herein to be performed by the host device independent of the computing device and/or independent of a network connection. That is, either the host device and/or the computing device may output a user interface on a display device to present a visualization of a possible malicious incident associated with an event.

In various examples, the user interface may comprise controls configured to emphasize, de-emphasize, and/or hide content related to the visualizations output for display. For instance, in some examples, the user interface may include quick-action buttons and wizards to permit users to immediately kill processes or isolate a particular host device from the network. The user interface may also or instead include controls to bulk-tag detected events associated with a pattern or visualization. Further description of the user interface is described in relation to FIGS. 5-7, and elsewhere.

In various instances, a host device may install, and subsequently execute a security agent as part of a security service system to monitor and record events and/or patterns on a plurality of computing devices in an effort to detect, prevent, and mitigate damage from malware or malicious attack. In various examples, the security agent may detect, record, and/or analyze events on the computing device, and the security agent can send those recorded events (or data associated with the events) to a security system implemented in the "Cloud" (the "security system" also being referred to herein as a "security service system," a "remote security service," or a "security service cloud"). At the security system, the received events data can be further analyzed for purposes of detecting, preventing, and/or defeating malware and attacks. The security agent resides on the host computing device, observes and analyzes events that occur on the host computing device, and interacts with a security system to enable a detection loop that is aimed at defeating all aspects of a possible attack.

Some examples herein relate to detecting malware or malicious behavior, e.g., by recording events performed by a processor executing one or more programs and analyzing distributions of the events by event type (e.g., a type of process, a type of thread, or lateral movement between host devices). For brevity and ease of understanding, as used herein, "suspicious" refers to events or behavior determined using techniques described herein as being possibly indicative of attacks or malicious activity. The term "suspicious" does not imply or require that any moral, ethical, or legal judgment be brought to bear in determining suspicious events.

As used herein, the term "adversaries" includes, e.g., malware developers, exploit developers, builders and operators of an attack infrastructure, those conducting target reconnaissance, those executing the operation, those performing data exfiltration, and/or those maintaining persistence in the network, etc. Thus the "adversaries" can include numerous people that are all part of an "adversary" group.

Some examples relate to receiving or processing event stream(s) or sequence(s) indicating activities of system components such as processes or threads. Many system components, including malicious system components, perform a particular group of operations repeatedly. For example, a file-copy program repeatedly reads data from a source and writes data to a destination. In another example, a ransomware program repeatedly encrypts a file and deletes the un-encrypted original. Some examples relate to detecting such repetitions. Some examples locate repeated groups of operations based on detected events, permitting malware detection without requiring disassembly or other inspection of the code for that malware.

The techniques described herein may be implemented in a number of ways. Example implementations are provided below with reference to the following figures. Although discussed in the context of a security system, the methods, apparatuses, techniques, and systems, described herein can be applied to a variety of systems (e.g., data storage systems, service hosting systems, cloud systems, and the like), and are not limited to security systems.

FIG. 1 illustrates an example system 100 for a security service system that monitors a plurality of host devices and uses a security component to facilitate collection of data for malicious incident detection, as described herein. The system 100 may include host device(s) 102(1)-102(N) (individually and/or collectively referred to herein with reference 102), where N is any integer greater than or equal to 2, that interact with the computing device(s) 108 of the security service system over network(s) 106.

In some embodiments, the network(s) 106 may include any one or more networks, such as wired networks, wireless networks, and combinations of wired and wireless networks. Further, the network(s) 106 may include any one or combination of multiple different types of public or private networks (e.g., cable networks, the Internet, wireless networks, etc.). In some instances, the host device 102 and the computing device(s) 108 communicate over the network(s) 106 using a secure protocol (e.g., https) and/or any other protocol or set of protocols, such as the transmission control protocol/Internet protocol (TCP/IP).

The host device 102 (sometimes called "host computing device," "host machine," or "monitored computing device") may implement a security components 104(1)-104(N) (individually and/or collectively referred to herein with reference 104, where N is any integer greater than or equal to 2), which is stored in memory of the host device 102 and executable by one or more processors of the host device 102. The host devices 102 may be or include any suitable type of host devices 102, including, without limitation, a mainframe, a work station, a personal computer (PC), a laptop computer, a tablet computer, a personal digital assistant (PDA), a cellular phone, a media center, an embedded system, or any other sort of device or devices. An entity may be associated with the host devices 102, and the entity may have registered for security services provided by a service provider of the computing device(s) 108.

The security component 104 may, in some embodiments, be kernel-level security agents. Such kernel-level security agents may each include activity pattern consumers that receive notifications of activity patterns associated with execution activity patterns of their respective host device 102, filters, an activity pattern bus that route activity patterns to other agent module(s), correlators that track types of activity patterns, actors that gather state information and act upon activity patterns, and a situational model. The kernel-level security agents may each be installed by and configurable by computing device(s) 108, receiving, and applying while live, reconfigurations of agent module(s) and the agent situational model. Further, the kernel-level security agents may each output activity patterns to the computing device(s) 108, the activity patterns including the security-relevant information determined by the security component 104. The security component 104 may continue to execute on the host device 102 by observing and sending detected activity to the computing device(s) 108 while the host device 102 is powered on and running.

In some embodiments, the security component 104 may be connected to the computing device(s) 108 via a secure channel, such as a virtual private network (VPN) tunnel or other sort of secure channel and may provide activity patterns conveying security-relevant information to the computing device(s) 108 through the secure channel. The security component 104 may also receive configuration updates, instructions, remediation, etc. from the computing device(s) 108 via the secure channel.

The host devices 102 may receive the security component 104 over the network(s) 106 from the computing device(s) 108 by downloading the security component 104 as a software package to be installed on the host devices 102. Together, the security component 104 of the host devices 102 and the computing device(s) 108 form a detection loop, which can be enabled by an agent architecture designed in accordance with the principles of the well-known OODA-loop (i.e., observe-orient-detect-act-loop). The security component 104 may include components that receive notifications of semantically-interesting activity patterns (e.g., file writes and launching executables) from host operating system hooks or filter drivers, from user-mode activity pattern monitors, or from threads monitoring log files or memory locations. Thus, the security component 104 may observe activity patterns, determine actions to take based on those activity patterns, and/or send observed activity patterns to the computing device(s) 108 for further analysis at the computing device(s) 108.

The detected activity observed by the security component 104 may be sent over the network(s) 106 to the computing device(s) 108, with or without further processing by the security component 104. For example, in some embodiments, the detected activity observed by the security component 104 may be filtered using first configurable filters of the security component 104 to remove known safe activity patterns to help reduce size of data transfer and then sent to the computing device(s) 108. Alternatively, the detected activity can be sent to the computing device(s) 108 without further filtering on the host devices 102.

A security component 104 of a host device 102 may trigger varying levels of containment for the host device 102 based on varying levels suspicious activity patterns. In response to determining that the host device 102 is compromised (e.g., aggregated incident score is above threshold), the computing device(s) 108 can send a containment instruction over the network 106 to the host device 102. Upon receipt of this containment instruction, the security component 104 may cause the host device 102 to enable (activate, trigger, etc.) network containment. To enable network containment on the host device 102, the security component 104 can implement a firewall policy included with the security component 104. Upon enforcement of the firewall policy, a firewall of the host device 102 denies outgoing data packets from, and incoming data packets to, the host device 102 that would have been allowed prior to the implementing of the firewall policy. In some embodiments, the firewall policy, may deny all traffic to and from the host device 102 with respect to other computing systems having remote network addresses (e.g., Internet Protocol (IP) addresses) that are not otherwise specified in the firewall policy as an exception for allowed traffic. In various embodiments, however, network containment can be implemented on the host device 102 in a manner that allows some communication to/from the host device 102 with the outside world over the network 106. For example, the firewall policy can specify exceptions for remote network addresses that are allowed to communicate with the host device 102 after containment is enabled/initiated and while the host device 102 remains contained. The firewall policy may allow some traffic to and from the computing device(s) 108 so that a communication channel remains open and usable between the host device 102 and the computing device(s) 108, even when the host device 102 is "contained" (or cutoff from communicating with the other host device(s) 102 besides the computing device(s) 108). To accomplish this result, the firewall policy can specify at least one remote network address (e.g., a remote IP address) associated with the computing device(s) 108, and may specify an action to allow outgoing data packets to, and incoming data packets from, the computing device(s) 108, which may be associated with the at least one remote network address that can be specified in the firewall policy. In some embodiments, the containment instructions may specify an action to block a specific suspicious activity pattern rather than trigger network containment if the suspicious activity pattern is limited in action.

In at least one configuration, the computing device(s) 108 may include any components that may be used to collect and analyze the observed activity patterns received from host device(s) 102, to report on suspicious activity patterns, and to mitigate any malware or malicious code found in the host device(s) 102. For example, the computing device(s) 108 may include an aggregation component 110, an analysis component 112, and a visualization component 114.

The aggregation component 110 may receive and store any client entity information and their associated security information including observed activity patterns received from the security agent on the host device(s) 102. Additionally, the aggregation component 110 may gather data from various sources for use with other modules. For example, the aggregation component 110 may gather enrichment data to help provide context to observed activity patterns. The aggregation component 110 may receive can events from the host devices(s) 102 and may aggregate the events per device into a plurality of events.

The analysis component 112 may determine if the host device(s) 102 is potentially compromised. Determining whether the host device(s) 102 is potentially compromised may include determining whether the activity patterns observed by the security component 104 are associated with malicious code or indicators of attack. In some embodiments, the analysis component 112 may analyze the observed activity patterns including cross-machine activities to determine if the connected host devices 102 are potentially compromised.

The analysis component 112 running on a computing device(s) 108 can detect patterns from events included in the plurality of events. The patterns may be detected based on any predetermined criterion to identify detected events that indicates that one or more events of the plurality of events may indicate suspicious and/or potentially malicious activity was occurring. The predetermined criterion may include, but is not limited to, a predetermined number of repeated sequence(s) of events, any processes performed by detection component 206 and analysis component 112 to determine patterns of detected events, patterns of known malicious activity, and patterns of statistical significance including visualizations 300, user interface 400, 500, and 600 as discussed herein with reference to FIGS. 3-6. In various examples, several detected events and/or detected patterns occurring together may imply a jointly higher statistical significance than each occurring separately. In the present example, the patterns can represent a single detected event or any repeated sequence of events that indicates malicious behavior. Analysis component 112 can detect a portion of the plurality of events including any read and write operations, and other operations, as a pattern. Examples are discussed herein, e.g., with reference to FIGS. 2-7.

In various examples, the aggregation component 110 and the analysis component 112 may detect patterns based on predetermined criterion and aggregate the detected patterns by pattern types using pattern identifiers. In some examples, the patterns aggregated by identifiers and/or types may identify patterns that are distinct or similar. In additional examples, the analysis component 112 may determine a total pattern count for the total number of non-distinct patterns detected in the plurality of events, determine a pattern specific count for each pattern aggregated by pattern type, and determine a pattern score for each pattern. In additional examples, the analysis component 112 may determine the pattern score for each pattern using different time intervals (e.g., 30 minutes, 1 hours, 24 hours, 1 week, 1 month, etc.) and store the scores as historical data for the different time intervals.

In some examples, analysis component 112 can determine pattern scores based on quantifying the amount of statistically significant information in the patterns detected from events in the plurality of events. The analysis component 112 can determine a pattern distribution of the frequency of each pattern, in which the pattern frequencies are sorted from highest frequency to lowest frequency. In various examples, the patterns may be scored at individual hosts level and/or global level (e.g., based on a network, a geographic area, etc.). The analysis component 112 may score patterns based on frequency distributions, which can be correlated with the statistical significance of information conveyed by the occurrence of the patterns. For instance, patterns that occur frequently may correlate with less useful information, conversely patterns that occur infrequently may correlate with more useful information. In various examples, the base pattern score for an associated pattern type may be inversely correlated with its frequency. For instance, a first pattern that occurs frequently may have a low pattern score, while a second pattern that occurs infrequently may have a high pattern score.

In various example, the analysis component 112 can determine pattern scores based on one or more information quantifying models. As a nonlimiting example, the pattern scores may be determined as "surprisal values" based on information theory and may assume using base-2 logs, and the result is a measure of information content of pattern presence in bits. That is: $\log 2(1/P(dt))$ or more simply $-\log 2(P)$, where $P(dt)$ is the probability that a randomly selected detection d is of type t. The detection d being of type t in this system is analogous to the Pi term in the surprisal equation formulated as: $I(E):=-\log[Pr(E)]=-\log(P)$.

Additionally, and/or alternatively, assuming events E are independent, the events E can be summed in log space which is homomorphic with multiplying them in scalar space. Accordingly, the surprisal values can be aggregated as: $-i \log(Pi)$. In some examples, the analysis component 112 can determine that some detected patterns ("detects") have some probable relationship, for example occurring clustered during a predetermined time interval on a particular host device, thus the pattern scores as determined by surprisal values can be summed to quantify the amount of information conveyed by the combination of detects. The analysis component 112 may determine an "incident" from this combination of detects and the sum of the surprisal values may be a "incident score."

In additional and/or alternate examples, the base pattern score may be adjusted by a weight based on additional information. For example, analysis component 112 can consult a pattern catalog to determine whether the pattern matches a known-good or known-bad pattern, a known-bad pattern would increase the weight to increase the pattern score and decrease the weight to decrease the pattern score for a known-good pattern. In an additional example, if the security system detects a similar pattern on multiple hosts at a similar time frame, the weight of the pattern score for that pattern may increase.

In some examples, analysis component 112 may determine the incident score based on the sum of the pattern scores for patterns detected in the plurality of events. The analysis component 112 may repeat determining the incident score by repeating the summation of pattern scores during a predetermined time interval. For instance, if the predetermined time interval is one hour, then at 7 o'clock, the incident score may be a summation of all pattern scores from 6:00-7:00. The incident score may or may not indicate that an incident is occurring. For instance, if the incident score is below a threshold score, it may not be associated with an incident, but if the incident score meets or exceeds a threshold score, then it may be related to an incident. The analysis component 112 can determine the incident score associated with an incident based on one or more scoring scheme, including, but not limit to: aggregating pattern scores associated with all detected patterns comprising the incident; or the maximum observed incident score during the incident's timespan. In various examples, the incident score can include total counts or percentages of all pattern types.

In some examples, analysis component 112 can determine that the plurality of events is associated with an incident indicating malicious behavior based on the incident score. In various examples, the determination may be based on one or more of: comparing incident scores to historical incident scores (e.g., compared to score from a week, a month, or a year ago, etc.), comparing the incident score to a predetermined threshold score, or ranking the incident scores and selecting a predetermined number of top incident scores to present to an analyst for further review. The analysis component 112 may create an incident by determining the start time and end time for an incident timespan. A newly created incident may be in an open state at a start time when the incident score initially meets or exceed a predetermined score threshold and in a closed state at an end time when the incident score falls below the predetermined score threshold. During the intervening time an incident can be updated to include newly detected patterns and its incident score may change.

In various examples, remediation actions are taken with respect to hosts (one or more) having scores above a predetermined threshold. For example, such hosts can be remotely rebooted, shut down, or disconnected from the network, or another local or remote management operation can be taken with respect to those hosts.

The visualization component 114 may enable a security analyst (also referred to as an administrator, support personnel, etc.) associated with the computing device(s) 108 to view alerts based on incidents detected and visualization of the incidents, alerts pertaining to host devices 102 that have been compromised, and/or to make decisions regarding appropriate responses to those incident detections and alerts.

In a nonlimiting example, the visualization component 114 may present example ranked incident scores 116 and example visualization 118. The example ranked incident scores 116 may present a predetermined number of incidents with the highest incident scores (e.g., top 10 or top 5) occurring within a predetermined time period (e.g., within 24 hours). The example visualization 118 may present an example time series graph representing the example ranked incident scores 116 to provide visual aid to permit the security analyst to view incidents most likely indicating malicious behavior. The example time series graph may present additional information for the incidents including the time interval and patterns with high pattern scores. The system may further aggregate scores to provide better overview of the situation by analyzing a small number of top scores to produce a confidence estimate of whether there is a multi-prong threat. This confidence estimate is a risk assessment that new high scoring incidents can be expected in the near future. The example visualization 118 may present the alerts with visualization for the group of activity patterns and the aggregated scores with the risk assessment results.

Figure 2:
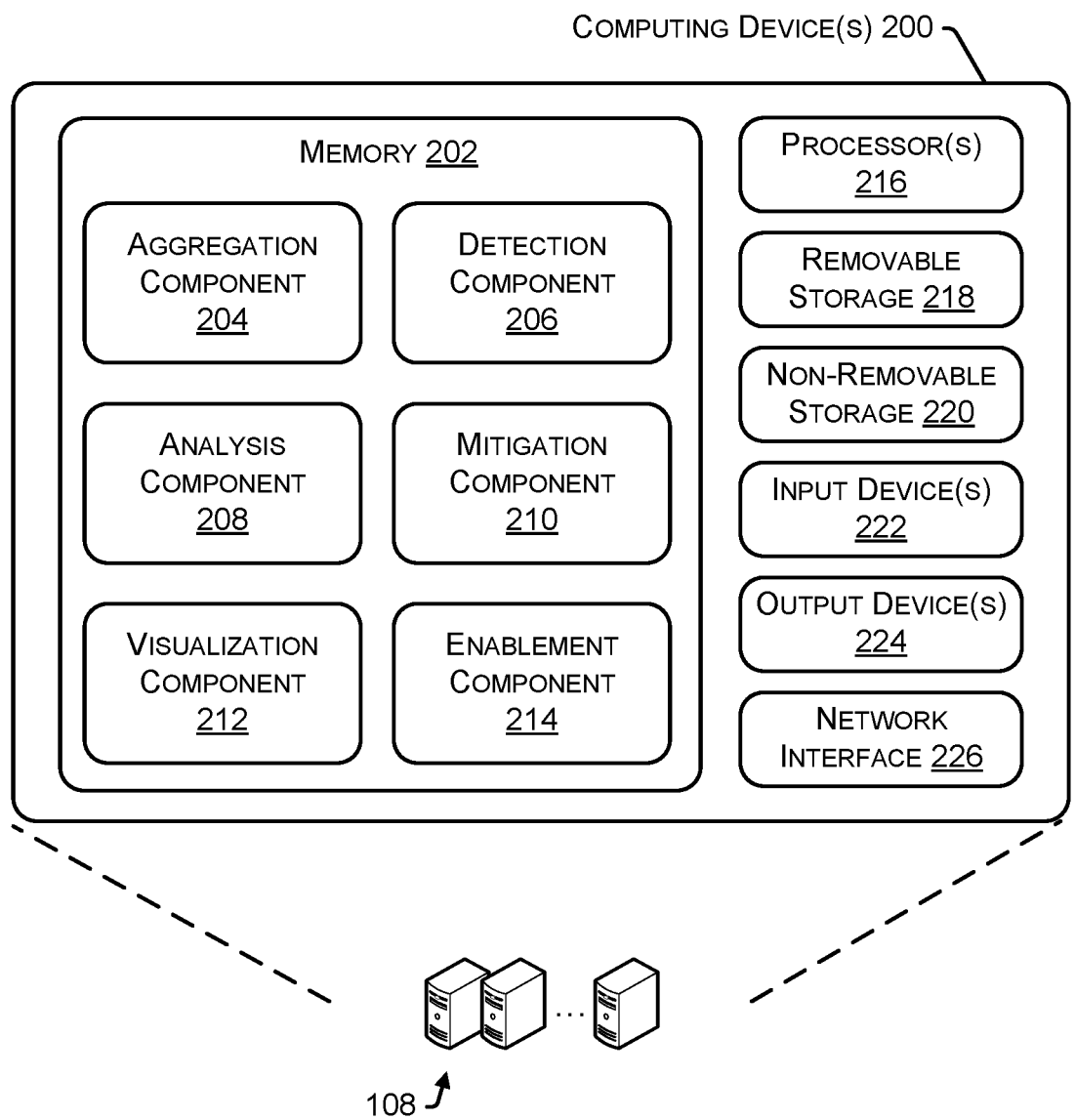
FIG. 2 is a block diagram of an illustrative computing architecture of the computing device(s) shown in FIG. 1.

FIG. 2 is a block diagram of an illustrative computing architecture of the computing device(s) 200. In some embodiments, the computing device(s) 200 can correspond to the computing device(s) 108 of FIG. 1. It is to be understood in the context of this disclosure that the computing device(s) 200 can be implemented as a single device or as a plurality of devices with components and data distributed among them. By way of example, and without limitation, the computing device(s) 200 can be implemented as various computing device 200(1), 200(2), . . . , 200(N) where N is an integer greater than 1.

As illustrated, the computing device(s) 200 comprises a memory 202 storing an aggregation component 204, a detection component 206, an analysis component 208, a mitigation component 210, a visualization component 212, and an enablement component 214. Also, the computing device(s) 200 includes processor(s) 216, a removable storage 218 and non-removable storage 220, input device(s) 222, output device(s) 224, and network interface 226.

In various embodiments, memory 202 is volatile (such as RAM), non-volatile (such as ROM, flash memory, etc.) or some combination of the two. The aggregation component 204, a detection component 206, an analysis component 208, a mitigation component 210, a visualization component 212, and an enablement component 214 stored in the memory 202 can comprise methods, threads, processes, applications or any other sort of executable instructions. The aggregation component 204, a detection component 206, an analysis component 208, a mitigation component 210, a visualization component 212, and an enablement component 214 can also include files and databases.

In various embodiments, the computer-readable memory 202 generally includes both volatile memory and non-volatile memory (e.g., RAM, ROM, EEPROM, Flash Memory, miniature hard drive, memory card, optical storage, magnetic cassettes, magnetic tape, magnetic disk storage or other magnetic storage devices, or any other medium). The computer-readable memory 202 may also be described as computer storage media or non-transitory computer-readable media, and may include volatile and non-volatile, removable and non-removable media implemented in any method or technology for storage of information, such as computer readable instructions, data structures, program modules, or other data. Computer-readable storage media (or non-transitory computer-readable media) include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, and the like, which can be used to store the desired information and which can be accessed by the security service system. Any such memory 202 may be part of the security service system.

The aggregation component 204 may receive and store any client entity information and their associated security information including observed activity patterns received from the security component 104 on the respective host device(s) 102. The aggregation component 204 may gather data from other modules that may be stored in a data store. In some embodiments, the aggregation component 204 may gather and store data associated with known information, such as domain information that is associated with known entities, for use as enrichment data by the visualization component 212.

In some instances, the aggregation component 204 can correspond to the aggregation component 110 of FIG. 1.

The detection component 206 may receive unprocessed or partially processed activities data from the security component 104. As previously discussed, the activity patterns observed by the security component 104 may be filtered using first configurable filters of the security component 104 to remove known safe activity patterns to help reduce size of data transfer or the activity patterns may be sent to the security service system without further processing on the host device(s) 102. The detection component 206 may have one or more configurable filters including filtering rules set by the analyst.

In some embodiments, the detection component 206 may also maintain and utilize one or more situational models (e.g., machine-learned models), such as models specific to individual host device(s) 102, to types of computing devices, to entities, or to a generic device to determine which activity patterns are "interesting" and may warrant additional analysis from the analyst. For example, while a host A machine remoting into a host B machine to run an executable file may be an "interesting" event, if the host A machine ran the same file on a hundred machines belonging to the same entity, this may be normal administrative behavior. Thus, the detection component 206 may filter the observed activity patterns received from security component 104 to remove the many legitimate use activity patterns to isolate "interesting" filtered activity patterns. The security service system may update these models based on the received notifications and utilize the models in analyzing the interesting activity patterns. In some embodiments, the detection component 206 may utilize a machine learning model (or algorithm) that is trained on a past corpus of activity patterns and detected malware attacks/intrusions on host device(s) 102 that utilized the security service system. Such a machine learning model is configured to process activity patterns received from a host device(s) 102 as input, and to generate an output of filtered activity patterns that is utilized by components of the security service system in analyzing the severity of threat on host device(s) 102.

Machine learning generally involves processing a set of examples (called "training data") in order to train machine learning model(s). A machine learning model, once trained, is a learned mechanism that can receive new data as input and estimate or predict a result as output. For example, a trained machine learning model can comprise a classifier that is tasked with classifying unknown input (e.g., an unknown activity patterns) as one of multiple class labels (e.g., a class label of "compromised" vs. "uncompromised", "high severity level" vs. "low severity level", etc.). Any single machine learning model, or an ensemble of base-level machine learning models, can be used for this purpose, including, without limitation, tree-based models, support vector machines (SVMs), kernel methods, neural networks, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of machine learning models whose outputs (predictions) are combined, such as by using weighted averaging or voting. The individual machine learning models of an ensemble can differ in their expertise, and the ensemble can operate as a committee of individual machine learning models that is collectively "smarter" than any individual machine learning model of the ensemble.

In some embodiments, the detection component 206 may classify the severity level for the filtered activity depending on the activity pattern type, based on whether that particular activity pattern type is a stronger indication of attack. That is, an activity pattern with explicit threat data showing obvious suspicious activity pattern on a remote system may be classified as a high severity level, while an activity pattern with inferred threat data showing signs of suspicious activity pattern may be classified as a medium severity level. For instance, an activity pattern with explicit data showing that Host A remoted into Host B, and is running multiple data gathering commands with lateral movement or is downloading suspicious files and scheduling tasks to run the files, may be classified as high severity level.

The analysis component 208 may determine if the host device(s) 102 is potentially compromised. Determining whether the host device(s) 102 is potentially compromised may include determining whether the activity patterns observed by the security component 104 are associated with malicious code or indicators of attack. In some embodiments, the analysis component 208 may analyze the observed activity patterns that include cross-machine activity patterns to determine if the host device(s) 102 are potentially compromised. In various embodiments, the analysis component 208 may analyze the observed activity patterns within a predefined time period that may be set to a default time period and may be modified by the analyst. The analysis component 208 may store all activities data as historical data that may be accessed by the analyst for further analysis.

In some instances, the analysis component 208 can correspond to the analysis component 112 of FIG. 1.

The analysis component 208 may aggregate incident scores to provide better overview of the situation. The analysis component 208 determine a fidelity value for each of the devices 102 based at least in part on the filtered activity patterns from the detection component 206, the time period of the observed activity pattern, and the classification of severity level. Additionally, and/or alternatively, host devices with "interesting" remoting activity patterns between them may be grouped together into a group of activity patterns and a fidelity value may be determined for the group.

The mitigation component 210 may generate alerts for an analyst to further investigate a possible attack on a device 102 or generate notifications of interesting activity patterns that needs further analysis. Additionally, to help draw attention to high severity level activity patterns or activity pattern groups, the mitigation component 210 may establish a threat alert priority scheme to help prioritize the presentation of activity patterns and alerts. The threat alert priority scheme may be based on the fidelity value, severity level, alert timeline, or any combination thereof. For example, the activity patterns and alerts may be ranked according to their severity level, followed by fidelity values, so that the activity patterns and alerts with highest severity level are presented first, sorted by the highest fidelity values first; then the next severity level is presented.

The visualization component 212 may enable an analyst, who is associated with the security service system, to view notifications of observed activity patterns, alerts pertaining to host device(s) 102 that have been compromised, and make decisions regarding appropriate responses to those activity patterns and alerts. Examples of graphs and user interface generate by the visualization component 212 are shown in FIGS. 3-6, which presents multiple graphical representations of alerts for "machines" corresponding to host device(s) 102 that are currently being monitored via the detection loop between security component 104 and the security service system, as described herein.

In various examples, the visualization component 212 may generate graphs that maps unbounded incident scores to a fixed range for an analyst to review. In some examples, the visualization component 212 may remotely store activity graphs of the compromised host device as subgraphs and may connect subgraphs to activity on a different device or before/after a reboot of the compromised host device. By visually connecting to the subgraphs to updated activity graphs, the visualization component 212 may indicate movement of malicious activity.

The visualization component 212 can present an alert indicating that a particular host device(s) 102 have been potentially compromised. These alerts may be based on the respective activity patterns observed by the respective security component 104 executing on those host device(s) 102, which activity patterns may have been determined to be associated with malicious code. It is to be appreciated that the visualization component 212 may also enable the analyst to examine activity patterns and associated data without first providing an alert.

The visualization component 212 may further present a selection element that, upon selection, provides further details pertaining to the alert, indicating a particular host device(s) 102 has been compromised. By selecting the particular host device(s) 102, the analyst can get detailed information as to the particular observed activity patterns, processes executing on the host device(s) 102 relating to those activity patterns, and/or other details about the potentially compromised host device(s) 102.

In various examples, the visualization component 212 may present the historical data associated with the particular machine(s) 102 for the analyst to perform further analysis. The visualization component 212 may present a timeline selection element that, upon selection, provides details pertaining to the historical activity patterns during a selected time period. In some examples, the visualization component 212 may present a log of any cross-machine activities for the selected time period. The visualization component 212 may present indicators within or over the timeline selection element to indicate certain activity pattern types to aid the analyst in identifying certain activity patterns.

The visualization component 212 may further present selection elements that, upon selection, to automatically generate a client report by populating at least a portion of a client report including some of the augmented data for the client entity associated with the host device(s) 102 in question. In some embodiments, the analyst may complete the remaining client report before sending the report to the host device(s) 102 or entity associated with the host device(s) 102. In this example, there may be instances where the analyst notices an alert of a potentially compromised host device(s) 102 in the visualization component 212, but after further inspection (e.g., by viewing further details about the activity pattern on the host device(s) 102), the analyst may determine, above some threshold level of confidence, that the host device(s) 102 is actually, or most likely, not compromised by malware, and may decide to refrain from reporting the host device(s) 102.

In other embodiments, the visualization component 212 may be configured to determine to surface a particular host device(s) 102 automatically (i.e., without human intervention), and may send non-confidential activity patterns alert to the particular host device(s) 102 without human intervention as well. For example, as discussed above, if the mitigation component 210 has determined that the fidelity value for a Host A device is extremely high, the visualization component 212 may alert the client entity associated with Host A device to begin taking at least some remedial actions on their devices. Additionally, an activity patterns notification that a remote activity pattern has been observed on Host B device may be automatically sent to the associated client entity. The visualization component 212 may present the alerts and notifications to the client entity utilizing any communication channel, such as an e-mail message, a website associated with the security service system, a text message, a push notification, a social network site, an application that is associated with the security service system and that resides on device(s) 102 associated with the client entity.

In some instances, the visualization component 212 can correspond to the visualization component 114 of FIG. 1.

The enablement component 214 may communicate with the security component 104 of the host device(s) 102, and to evaluate suspicious activity patterns identified by the security component 104. For example, the security service system may be configured to receive activity patterns and data related to such activity patterns, such as forensic data associated with observed activity patterns. Upon receiving notification of an interesting activity pattern from a security component 104, the enablement component 214 may determine if related notifications have been received from other security component 104 of other host device(s) 102. Additionally, and/or alternatively, the enablement component 214 may evaluate the interesting activity pattern based on one or more rules or heuristics. The enablement component 214 may determine that an interesting activity pattern may be associated with malicious attack based on these determinations and evaluations and may, in response, perform any or all of generating an activity pattern and providing the activity pattern to host device(s) 102 (e.g., for containment purposes, and/or diagnostic, healing, or other purposes), sending updates (e.g., a new version of the security component 104, new signatures, new firewall policies etc.), instructing the host device(s) 102 to perform a remediation action to heal the host device(s) 102 or otherwise counter malicious code. In various embodiments, the enablement component 214 may send a containment instruction, to a security component 104 residing on a host device(s) 102, to specify an action to block a specific "interesting" activity pattern observed. For example, if the enablement component 214 determines that there is a malicious process running cross-machine between host device(s) 102, the enablement component 214 may send instructions to block that activity pattern. In some embodiments, if the same malicious process is observed on multiple devices, the enablement component 214 or another component of the security service system may dynamically generate a new policy specifying an action to block the specific activity pattern and send the new policy to the security component 104 residing on other host device(s) 102 belonging to a certain In some instances, any or all of the devices and/or components of the computing device(s) 200 may have features or functionality in addition to those that FIG. 2 illustrates. For example, some or all of the functionality described as residing within any or all of the computing device(s) 200 of the security service system may reside remotely from that/those computing device(s) 200, in some implementations.

The computing device(s) 200 may be configured to communicate over a telecommunications network using any common wireless and/or wired network access technology. Moreover, the computing device(s) 200 may be configured to run any compatible device operating system (OS), including but not limited to, Microsoft Windows Mobile, Google Android, Apple iOS, Linux Mobile, as well as any other common mobile device OS.

The computing device(s) 200 also can include input device(s) 222, such as a keypad, a cursor control, a touch-sensitive display, voice input device, etc., and output device(s) 224 such as a display, speakers, printers, etc. These devices are well known in the art and need not be discussed at length here.

As illustrated in FIG. 2, the computing device(s) 200 also includes the network interface 226 that enables the computing device(s) 200 of the security service system to communicate with other computing devices, such as any or all of the host device(s) 102.

Figure 3:
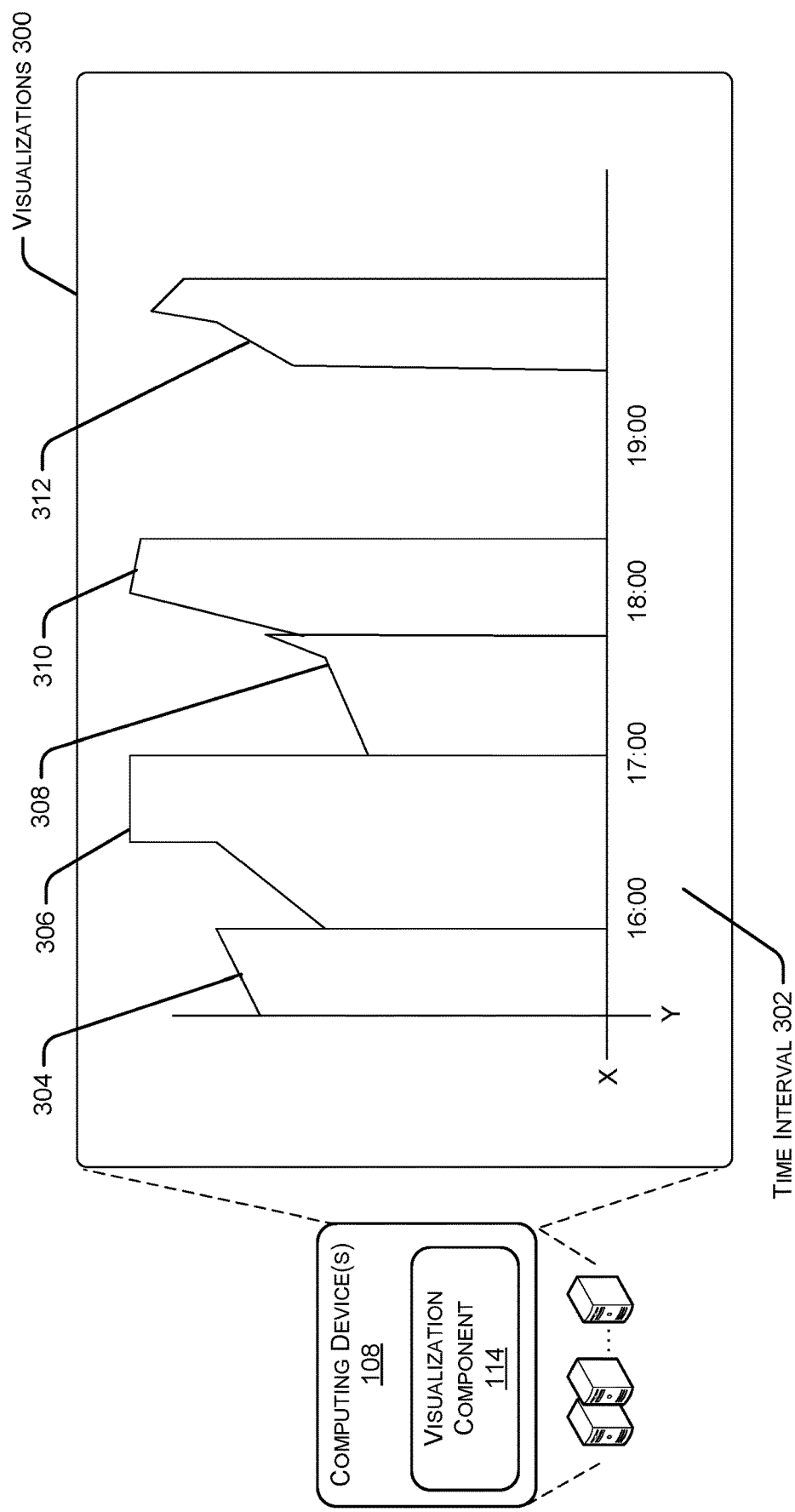
FIG. 3 illustrates an example visualization component for providing example visualizations of possible malicious incidents associated with one or more events, as discussed herein.

FIG. 3 illustrates an example visualization component for providing example visualizations of possible malicious incidents associated with one or more events, as discussed herein. In general, the example visualizations 300 provide an overview of possible malicious incidents associated with an event on a computing device, such as the computing device 108 or the computing device 200. In some instances, the example visualizations can represent and/or be based on example incident scores as described herein.

In a nonlimiting example, the visualization component 114 of FIG. 1 or the visualization component 212 of FIG. 2 may generate the example visualizations 300 and may present an example time series graph representing a subset of the highest ranked incident scores to provide visual aid (without necessarily outputting code related to the incident) to permit a security analyst to view incidents most likely indicating malicious behavior. The example time series graph may present additional information for the incidents 304, 306, 308, 310, and 312 (collectively "the incidents") including the time interval 302. For instance, the time interval 302 comprises a start time and an end time of the event (or a portion of the event) associated with each respective incident.

As shown in FIG. 3, information of the incidents may be conveyed visually as a pattern of activity. In some examples, a system, such as the system 100, generates one or more values (e.g., visualization values) based at least in part on an incident score, and outputs a pattern showing incident activity based on the visualization values. In FIG. 3 the pattern is representative of a graph that shows a characteristic of the incident on the y-axis relative to a change in time on the x-axis. The incident 308 reflects an increasing magnitude along the y-axis at times between 17:00 and 18:00 to reflect a potential impact the incident may have on the event over the time interval 302. The pattern of activity may be determined by the system in a variety of ways including using machine-learned algorithms that process event data as input and output a pattern that correlates the event data to an image for presentation in a user interface.

While FIG. 3 shows the system outputting an example visualization that comprises a time series graph, other visualizations may be output by the system to animate activity by the incident. In some examples, the system may generate visual imagery (e.g., a video with changing color, texture, or the like that animates information about the incident). In such an example, the visual imagery may reflect a memory or other component location of the host device that the incident attempts to access. In this way, an incident attempting to access a more sensitive memory or component location may be presented in a user interface with a color, change in in color, and/or texture that highlights the incident relative to the memory or the component location. In the example of FIG. 3, the incident 312 may show a steep increase along the y-axis over a time interval to reflect that the incident is attempting to access a memory storing sensitive data (e.g., login credentials, user authentication data).

As noted above, the system may, in some examples, generate visual imagery to show potentially malicious activity on one or more host devices. For instance, an activity may comprise a process creation, a thread injection, a user authentication operation, or lateral movement between a first host device and a second host device. By way of example and not limitation, responsive to detecting that a first host device initiated a process for execution by a second host device, the system may output for display an animation representing a connection between the process, the first host device, and the second host device. In various examples, the system may output the animation over a time interval to reflect a potential impact the activity may have on the first host device and/or the second host device at one or more different times. In this way, the system may generate visual imagery that indicates a type of activity, an amount of time the activity occurs, and/or a level of impact that the activity is likely to have on a host device(s).

In some examples, the system may indicate that the incident on the monitored host device may or may not have been "compromised" by malicious behavior (e.g., adversarial activity, malware, etc.) based on the event data gathered from the detected events. For instance, the system may receive data for events performed by programs on a monitored host device. The event data may be analyzed to detect patterns in the events. The patterns may be scored based on the importance of information conveyed by the presence of the patterns based on a frequency of appearance. The system may store the patterns for each event and access the patterns from storage for processing (e.g., comparing a pattern of an event to the stored patterns, determining whether the event exhibits a pattern similar to one or more of the stored patterns, and identifying the pattern for the event as suspicious based at least in part on the comparison of the patterns).

In various examples, patterns that appear frequently may correlate with less useful information (e.g., information that is relatively less likely to permit detecting a malicious incident); conversely, patterns that appear infrequently may correlate with more useful information (e.g., information that is relatively more likely to permit detecting a malicious incident). For instance, the system may assign a first pattern appearing with a relatively high frequency a lower pattern score than a pattern score assigned to a second pattern appearing infrequently. The pattern scores may be adjusted by weights based additional information detected by the system. For instance, if the system detects a similar pattern on multiple devices at a similar time frame, the weight of the pattern score for that pattern may increase. The pattern scores may be aggregated by a predetermined time interval by the system to determine an incident score. The system may compare the incident score to a threshold score to determine if an incident indicating possible malicious behavior is occurring. An incident is started when the incident score first exceeds the threshold score and ends when the incident score falls below the threshold score. The incident may be classified (e.g., based on event types) and tagged with additional information found in the data from the detected events and patterns. The incidents may be ranked by their incident scores to surface incidents with higher incident scores, which may indicate more signs of the device being "compromised" by malicious-behavior.

In some examples, the analysis component 208 can determine that the plurality of events is associated with an incident indicating malicious behavior based on the incident score. In various examples, the determination may be based on one or more of: comparing incident scores to historical incident scores (e.g., compared to score from a week, a month, or a year ago, etc.), comparing the incident score to a predetermined threshold score, or ranking the incident scores and selecting a predetermined number of top incident scores to present to an analyst for further review. The analysis component 208 may create an incident by determining the start time and end time for an incident timespan. A newly created incident may be in an open state at a start time when the incident score initially meets or exceed a predetermined score threshold and in a closed state at an end time when the incident score falls below the predetermined score threshold. During the intervening time an incident can be updated to include newly detected patterns and its incident score may change.

In the present example, the incidents represented by the example time series graph may include detected incidents 304, 306, 308, 310, and 312. There may be a time interval between 18:00 and 19:00 (between incidents 310 and 312) where the incident score for the detected events did not exceed the threshold score. The incident scores for each of the five incidents may be ranked and/or aggregated with other incident scores within a predetermined score time (e.g., a day, a week, etc.).

In some instances, the example incident scores can be generated by the detection component 206, analysis component 208, and/or the visualization component 212 as discussed herein. However, in other instance the functionality provided by the system may be implements entirely by the host device, without or without a connection to communicate to a network.

Figure 4:
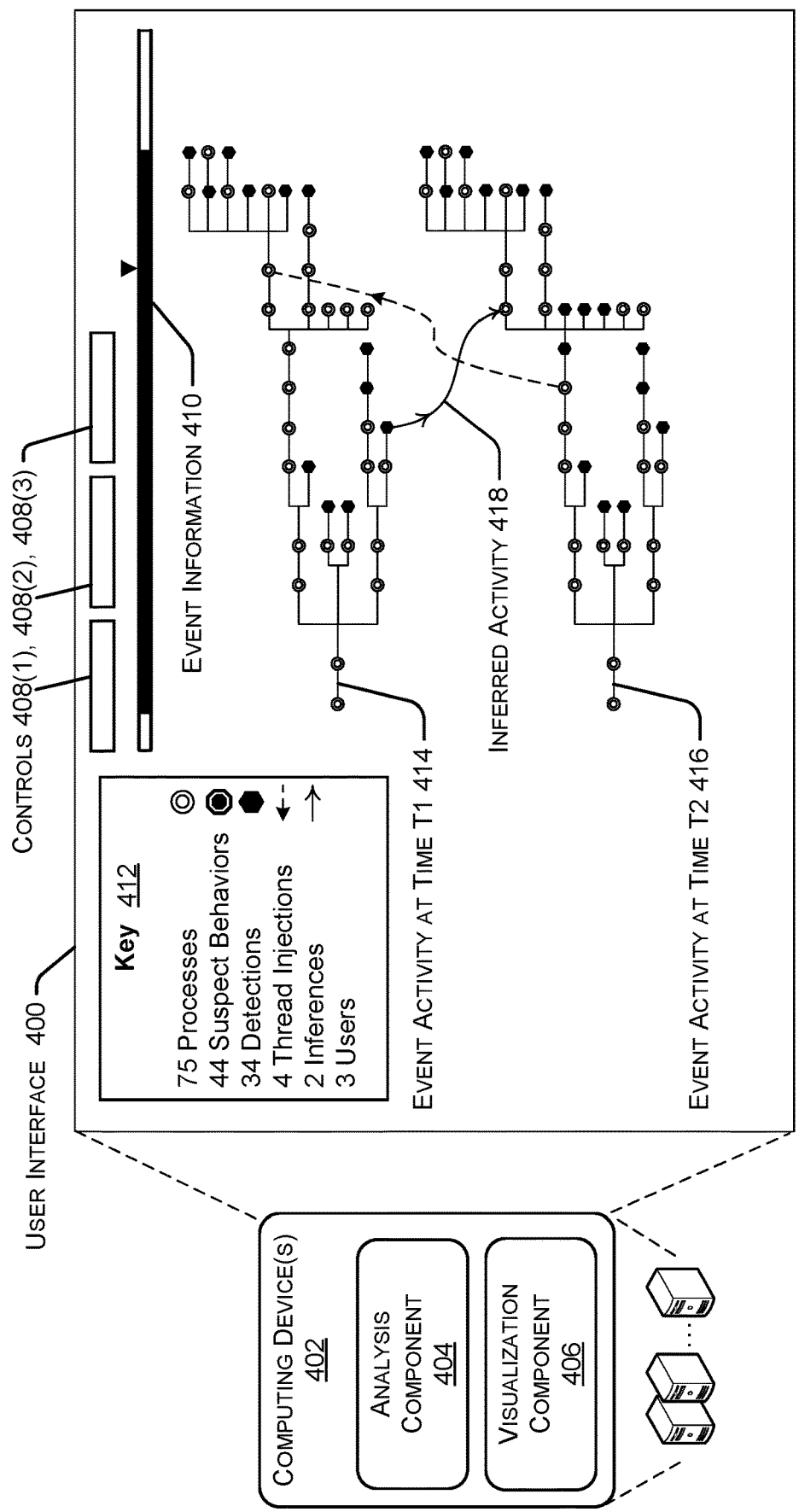
FIG. 4 illustrates an example user interface of a visualization component for providing an example visualization of an event on a host device, as discussed herein.

FIG. 4 illustrates an example user interface 400 of a visualization component for providing an example visualization of an event on a host device, as discussed herein. In general, the user interface 400 provides an overview of possible malicious incidents associated with an event on a computing device, such as the computing device 108 of FIG. 1 or the computing device 200 of FIG. 2.

As depicted in FIG. 4, one or more computer device(s) 402 comprises an analysis component 404 and a visualization component 406. The analysis component 404 and the visualization component 406 may be configured to provide functionality similar to the analysis component 112 and the visualization component 114 of FIG. 1, respectively. As shown in the example of FIG. 4 the user interface 400 comprises controls 408(1), 408(2), 408(3), and so on (collectively referred to as "controls 408") to invoke different functionality based on receiving a user input and event information 410 to represent details of the event. For instance, the event information 410 may indicate when specific activity related to the event takes place on the host device 102. In some instances, the event information 410 may represent an amount of processor activity taken at a point between a start time and an end time of the event (e.g., a bar graph may appear to show an amount of processing for a time period between the start time and the end time). In this way, an analyst may, in some examples, review the visualization of the user interface 400 to determine whether the event includes malicious behavior.

As mentioned above, the controls 408 may invoke different functionality to visually present the event in different ways. For instance, one of the controls 408(1), 408(2), or 408(3), may correspond to a summary, a graph, or a timeline, that if selected, outputs corresponding information specific to the incident and/or the event. In some examples, one or more of the controls 408 may be used to invoke a search of event information (e.g., a search of data associated with an event type), view textual data such as code, and/or append comments related to the event in the user interface 400, and so on. In some examples, one of the controls 408(1), 408(2), or 408(3), may be configured to, responsive to selection, cause presentation of alternative visualization(s) (different combinations of graphs, maps and/or imagery) than a currently presented visualization.

As noted above, in some examples, one or more of the controls 408 of the user interface 400 may be configured to invoke a search of event information based at least in part on a type of event associated with the event information. For instance, the control 408(1) may be configured to search event information based on lateral movement between two or more host devices and output results of the search (e.g., a visualization(s)) for display in the user interface 400. In various examples, an additional control 408(2) (or another portion of the control 408(1)) may, in response to receiving an input, search the event information and output varying levels of detail about lateral movement between two or more host devices.

FIG. 4 also depicts the user interface 400 as comprising a key 412 usable to interpret event activity at time T1 414, event activity at time T2 416, an/or inferred activity 418. As explained in more detail below, the key 412 can comprise information about one or more of: a process, a suspected behavior, a detection, a thread injection, lateral movement, an inference, or a user, just to name a few. In some examples, each type of the information in the key 412 may be associated with a symbol or other visual representation. In various examples, any information in the key 412 may be associated with a corresponding control (e.g., control 410 (4), 410(5), and so on (not shown)) to cause the user interface 400 to present additional detail specific to each piece of information. For instance, selecting thread injections from the key 412 via a control (not shown) can cause the event activities 414 and 416 to update or otherwise present one or more thread injections related to the event. In a non-limiting example, selecting lateral movement from the key 412 via a control (not shown) can cause one of the event activity 414 and/or the event activity 416 to update (e.g., add or remove content) to highlight or present lateral movement information related to the event. In some examples, selecting lateral movement from the key 412 via a control (not shown) can cause presentation of a visualization of details associated with the lateral movement.

In some examples, selecting the "users" area of the user interface 400 (e.g., a control in an area of the key 412 specific to the users such as text "users" or a symbol) may cause presentation of the one or more users associated with the possibly malicious incident to appear in the event activity 414 and/or the event activity 416 as additional symbols. In some instances, selecting the "users" area of the user interface 400 may cause presentation of the one or more users associated with the event activate 414 and/or the event activity 416 to change from a first symbol to a second symbol (e.g., add color(s) to the suspicious activity symbol for each user affected).

In various instances, the key 412 may remain presented (in varying size and/or shape) from an initial presentation of a visualization to a subsequent presentation of an alternate visualization. By way of example and not limitation, the key 412 may present the information using symbols with limited or no text.

The event activity 414 and the event activity 416 can represent an image, a graph, a map, an animation, or other visualization that conveys activity related to the event at different times before and after a possible malicious incident. As shown in FIG. 4, the event activity 414 and the event activity 416 illustrate a tree of processes and/or threads associated with a processor of the host device 102. In some examples, either the event activity 414 or the event activity 416 may reflect activity of the event on another host device while in other examples the event activities 414 and 416 may be combined as a single event activity representing a single host device.

The computing device 402 may implement the analysis component 404 to detect the inferred activity 418 caused by executing at least a portion of the event on the host device. The inferred activity 418 may represent an activity initiated by a processor on the host device (e.g., a first host device) that is intended for execution by a different processor of a different host device (e.g., a second host device). By way of example and not limitation, a process to authenticate a user on the first host device may initiate a process on the second host device related user authentication that is malicious. By implementing the techniques described herein, the computing device 402 can capture and display an animation of the process intended for the second host device which improves the user interface by presenting an amount and type of data in the user interface (e.g., provides visual emphasis to otherwise harmless appearing processes) most useful for verification of potentially malicious events.

The computing device 402 may determine the inferred activity 418 based on a type of process or thread associated with an event. For example, a process or a thread may be related to a type including one or more of: user authentication, services, scheduled tasks, parent/child, injection, system management interrupt, write-run, other process or thread type. For example, the computing device 402 may determine the inferred activity 418 on the second host device relates to activity to modify a registry to run malware, and in response, output a user interface that represents the inferred activity 418. In this way, the visualization in the user interface can be thought of as indicating "lateral movement" of an event between two or more host devices. In some examples, the inferred activity 418 can be shown as "connecting" to portions of corresponding process trees associated with respective host devices.

In various examples, the computing device 402 may determine whether to present a visualization of an event or incident based at least in part on the inferred activity 418 detected on a second host device. In examples when the event is a login type, the computing device 402 may identify one or more inferred activities 418 associated with the event on one or more other host devices, and generate and present the visualization in a user interface with controls 408 to enable an analyst to verify that the event includes activity that inhibits operation of the host device (or the one or more other host devices).

Figure 5:
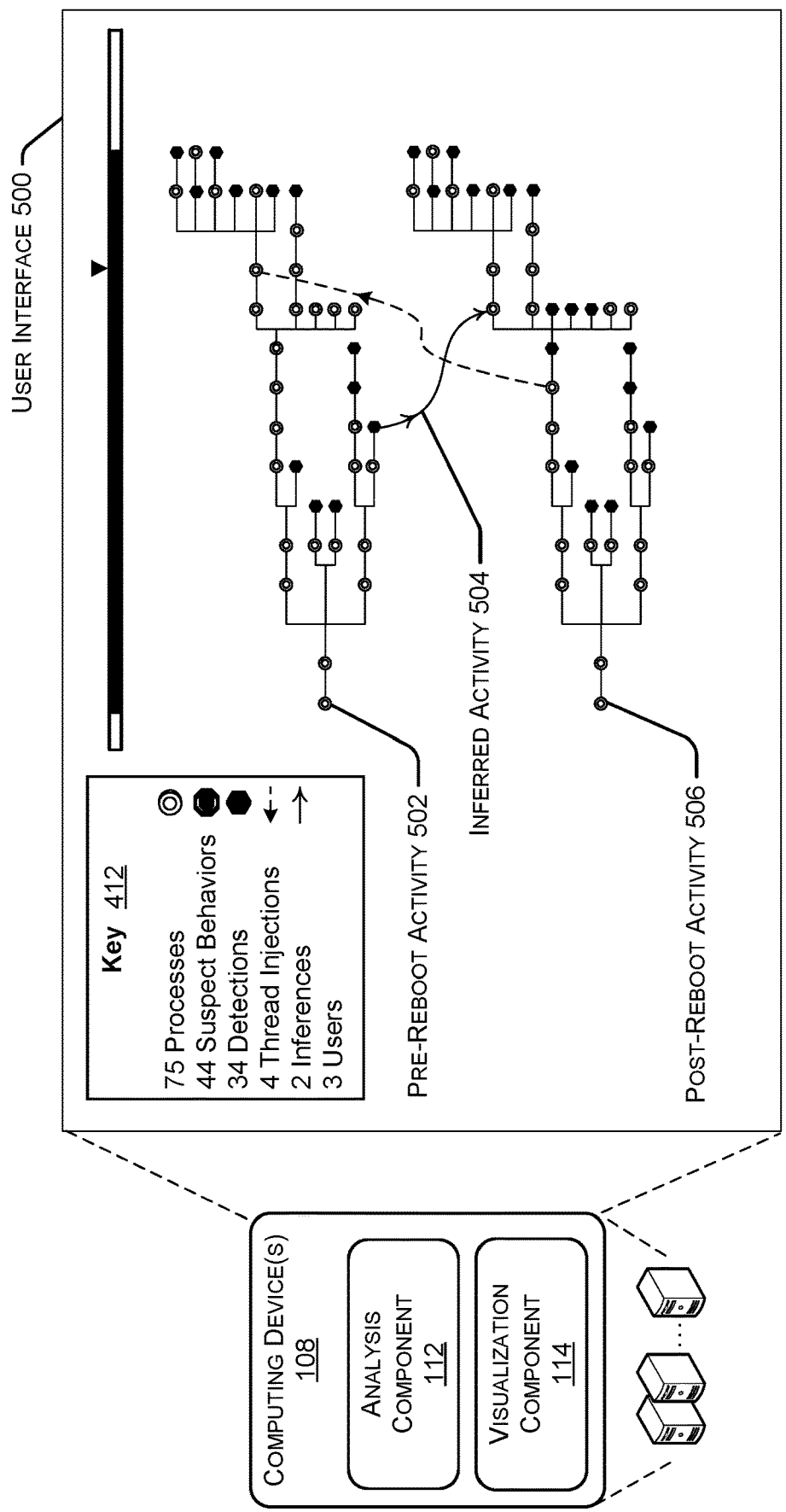
FIG. 5 illustrates another example user interface of a visualization component for providing an example visualization of an event on a host device, as discussed herein.

FIG. 5 illustrates another example user interface 500 of a visualization component for providing an example visualization of an event on a host device, as discussed herein. As depicted, FIG. 5 illustrates an example visualization of detecting malicious activity and connecting subgraphs representing activity on a single host device after a reboot, as discussed herein. In some instances, the example user interface 500 can represent as example post-reboot activity graph.

In some instances, the visualization component 212 can present a user interface to represent various activity graphs including example pre-reboot activity 502 and example post-reboot activity 506. Further, the example user interface 500 can represent various activity data detected at Host A during a first time before a reboot and a subsequent time after the reboot, as discussed herein.

In the present example, the system may determine during the first time that Host A is under attack based on malicious activity within some confidence threshold. The system may save the activity graph of example pre-reboot activity 502. Following a reboot, the system may present the saved activity graph including the malicious activity of example pre-reboot activity 502 with newly detected activity in the activity graph of example post-reboot activity 506. The system may trace activities between before and after reboot and may visually identify the inferred activity 504 related to the malicious activity.

In some instances, the example post-reboot activity graph 500 can be generated by the visualization component 114 or the visualization component 212, as discussed herein. Of course, the example visualizations are not limited to example post-reboot activity graph 500.

Figure 6:
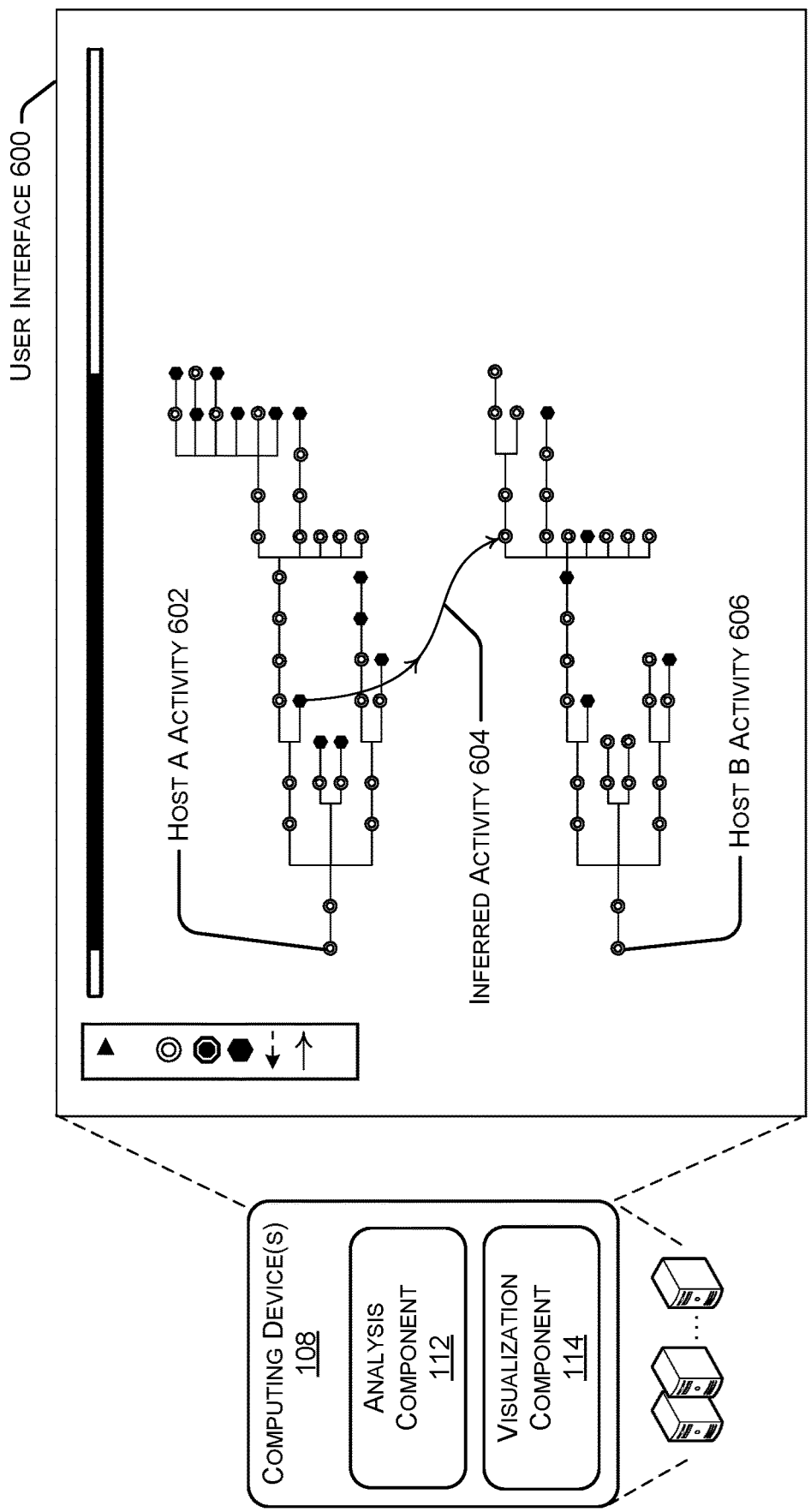
FIG. 6 illustrates yet another example user interface of a visualization component for providing an example visualization of an event on a host device, as discussed herein.

FIG. 6 illustrates another example user interface 600 of a visualization component for providing an example visualization of an event on a host device, as discussed herein. As depicted, FIG. 6 illustrates an example visualization of detecting movement from a first host device with detected malicious activity to second host device by connecting subgraphs representing activity on different computers, as discussed herein. In some instances, the example user interface 600 can represent example lateral movement activity.

In some instances, the example user interface 600 can represent various activity graphs including Host A Process 602 and Host B Process 606. Further, the example user interface 600 can represent various activity data detected at Host A during a first time and a subsequent lateral movement to Host B, as discussed herein.

In the present example, the system may determine during the first time that Host A is under attack based on detected activity within some confidence threshold. Based on the lateral movement from a compromised Host A, the system may present the activity graph including the detected activity of Host A Process 602 with detected activity in an activity graph of Host B Process 606. The system may trace activities triggered by compromised Host A on Host B and may identify the inferred activity 604 as related to the malicious activity.

In some instances, the example user interface 600 can be generated by the visualization component 114 or the visualization component 212, as discussed herein. Of course, the example visualizations are not limited to example lateral movement activity. Further, the Host A Process 602 or Host B Process 606 are not limited to activities from Host A and Host B and may include activities from additional host devices (such as those associated with a security service).

Figure 7:
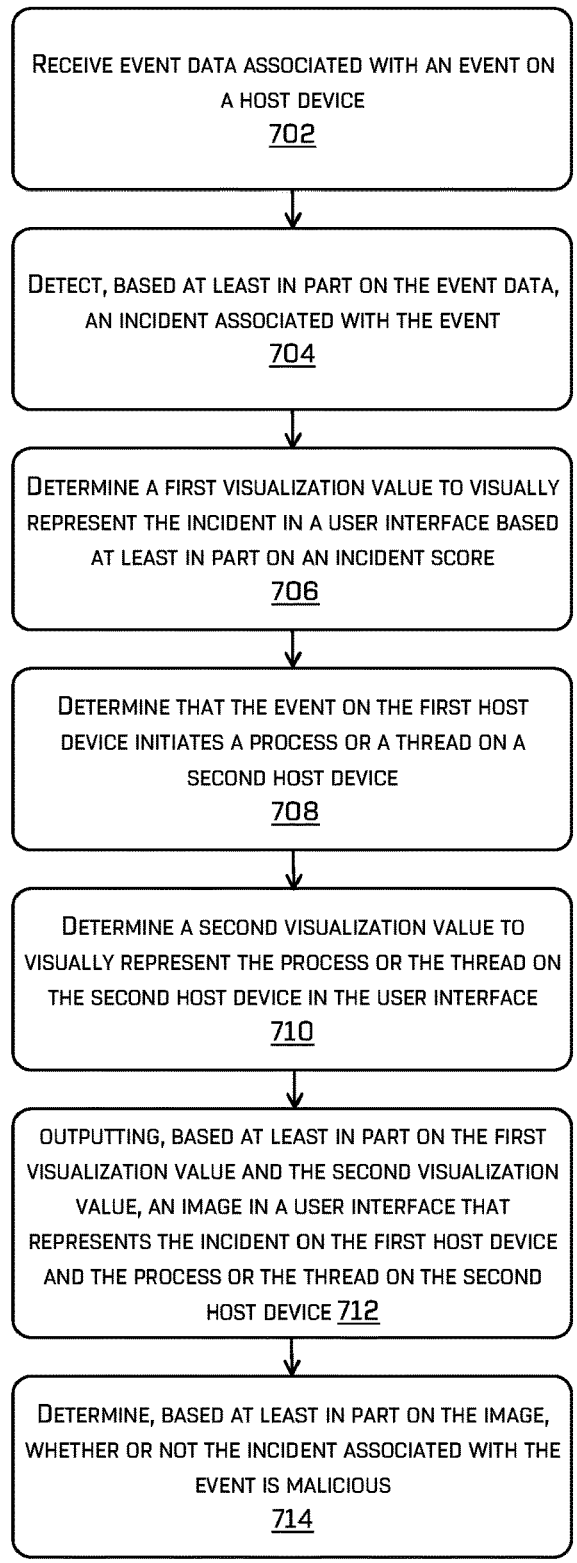
FIG. 7 is a flowchart depicting an example process for determining a malicious incident based on visualizations of events on a host device.

FIG. 7 is a flowchart depicting an example process 700 for determining a malicious incident based on visualizations of events on a host device. Some or all of the process 700 may be performed by one or more components in FIG. 1, as described herein. For example, some or all of process 700 may be performed by the computing device 108.

At operation 702, the process may include receiving event data associated with an event on a first host device. For instance, the computing device 108 or the host device 102 may receive event data associated with the host device 102. The event data may comprise process data or thread data sensed by one or more sensors of the host device.

At operation 704, the process may include detecting, based at least in part on the event data, an incident associated with the event. For instance, the computing device 108 or the host device 102 may employ a variety of techniques as described herein to process the event data to detect an incident associated with the event. The incident may be representative of malicious behavior associated with a process or a thread.

At operation 706, the process may include determining a first value to visually represent the incident in a user interface based at least in part on an incident score representative of a likelihood for the incident to impact operation of the first host device. In various examples, the computing device 108 or the host device 102 may determine a value that graphically represents the incident when output for display. The incident score may be determined by the computing device or the host device in a variety of ways as described herein and be used to determine which incidents may be presented as one or more visualizations in the user interface.

At operation 708, the process may include determining a second value to visually represent, in the user interface, a process or a thread on a second host device associated with the event. For instance, the computing device 108 or the host device 102 may determine that an action is occurring on the second host device based at least in part on the incident at the first host device and determine the second value to visually represent the process or the thread on the second host device.

At operation 710, the process may include outputting, based at least in part on the first value and the second value, an image in the user interface that represents the incident on the first host device and the process or the thread on the second host device. For instance, the computing device 108 or the host device 102 may output the image (a graph, a map, an animation, or a combination thereof) based at least in part on correlating the event data from the first host device and data associated with the second host device), and/or correlating the first value and the second value (e.g., combining respective data of the first value and the second value to a common scale or coordinate system).

At operation 712, the process may include determining, based at least in part on the image, whether or not the incident associated with the event is a malicious incident. For instance, the computing device 108 or the host device 102 may employ a machine-learned model to analyze the image and identify, based on the analysis, whether or not the incident is associated with malicious behavior. In some examples, an analyst trained to identify suspicious behavior based on the image may provide an input to a control of the user interface verifying that the incident associated with the event is a malicious incident.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform selected functions or implement particular abstract data types. The order in which the operations are described is not intended to be construed as a limitation, and any number of the described operations can be combined in any order and/or in parallel to implement the processes. In some embodiments, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computer devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   determining a first visual representation of an incident associated with an event on a first host device;
   determining that the event on the first host device initiates a process or a thread on a second host device;
   determining a second visual representation of the process or the thread on the second host device;
   outputting the first visual representation and the second visual representation on a display device to visually represent a connection between the incident on the first host device and the process or the thread on the second host device; and
   determining, based at least in part on the first visual representation and the second visual representation output on the display device, whether or not the incident associated with the event is a malicious incident.

2. The method as recited in claim 1, wherein:
   the first visual representation is associated with a first time, and
   the second visual representation is associated with a second time different from the first time.

3. The method as recited in claim 1, wherein:
   the first visual representation is associated with a pre-boot activity on the first host device, and
   the second visual representation is associated with a post-boot activity on the first host device.

4. The method as recited in claim 1, further comprising:
   outputting a connector between the first visual representation and the second visual representation for display on the display device to represent the connection.

5. The method as recited in claim 1, further comprising:
   outputting, for display on the display device, one or more symbols to communicate an activity type for the incident, a related event, or a level of suspicious activity for the incident.

6. The method as recited in claim 1, wherein the first visual representation or the second visual representation represents a pattern, and further comprising:
   comparing the pattern to one or more stored patterns; and
   determining whether or not the incident associated with the event is malicious based at least in part on the comparing the pattern to one or more stored patterns.

7. The method as recited in claim 1, wherein:
   the first visual representation and the second visual representation communicates a level of impact of the thread or the process on operation of the second host device.

8. A system comprising:
   one or more processors; and
   one or more computer-readable media storing instructions that, when executed by the one or more processors, cause the one or more processors to perform operations comprising:
      determining a first visual representation of an incident associated with an event on a first host device;
      determining that the event on the first host device initiates a process or a thread on a second host device;
      determining a second visual representation of the process or the thread on the second host device;
      outputting the first visual representation and the second visual representation on a display device to visually represent a connection between the incident on the first host device and the process or the thread on the second host device; and
      determining, based at least in part on the first visual representation and the second visual representation output on the display device, whether or not the incident associated with the event is a malicious incident.

9. The system as recited in claim 8, wherein:
   the first visual representation is associated with a first time, and
   the second visual representation is associated with a second time different from the first time.

10. The system as recited in claim 8, wherein:
    the first visual representation is associated with a pre-boot activity on the first host device, and
    the second visual representation is associated with a post-boot activity on the first host device.

11. The system as recited in claim 8, the operations further comprising:
    outputting a connector between the first visual representation and the second visual representation for display on the display device to represent the connection.

12. The system as recited in claim 11, wherein determining whether or not the incident associated with the event is the malicious incident is further based at least in part on outputting the connector.

13. The system as recited in claim 11, wherein at least one of:
   a first end of the connector comprises one or more symbols to communicate an activity type for the incident, a related event, or a level of suspicious activity for the incident, or
   a second end of the connector comprises one or more symbols to communicate a level of suspicious activity for the process or the thread on the second host device.

14. The system as recited in claim 8, wherein the first visual representation or the second visual representation represents a pattern, and the operations further comprising:
   comparing the pattern to one or more stored patterns; and
   determining whether or not the incident associated with the event is malicious based at least in part on the comparing the pattern to one or more stored patterns.

15. The system as recited in claim 8, wherein:
   the first visual representation and the second visual representation communicates a level of impact of the thread or the process on operation of the second host device.

16. The system as recited in claim 8, the operations further comprising:
   transmitting data representing the first visual representation and the second visual representation to a computing device for output on the display device.

17. The system as recited in claim 8, wherein:
   the first visual representation and the second visual representation are output in a user interface on the display device.

18. A non-transitory computer-readable storage media storing instructions that, when executed, cause one or more processors to perform operations comprising:
   determining a first visual representation of an incident associated with an event on a first host device;
   determining that the event on the first host device initiates a process or a thread on a second host device;
   determining a second visual representation of the process or the thread on the second host device;
   outputting the first visual representation and the second visual representation on a display device to visually represent a connection between the incident on the first host device and the process or the thread on the second host device; and
   determining, based at least in part on the first visual representation and the second visual representation output on the display device, whether or not the incident associated with the event is a malicious incident.

19. The non-transitory computer-readable storage media of claim 18, wherein determining whether or not the incident associated with the event is malicious comprises at least one of:
   receiving first data representing an input verifying that a pattern in one of the first visual representation or the second visual representation is suspicious and determining that the incident associated with the event is malicious based at least in part on the input; or
   receiving second data representing an input verifying that the pattern in one of the first visual representation or the second visual representation is not suspicious and determining that the incident associated with the event is not malicious based at least in part on the input.

20. The non-transitory computer-readable storage media of claim 18, wherein:
   the first visual representation or the second visual representation comprises one or more of: a process tree or one or more symbols to represent activity by a processor of the first host device.

\* \* \* \* \*